Feb. 12, 1935.  LA VERNE R. PHILPOTT  1,991,062
METHOD OF AND APPARATUS FOR INDUCTIVE HEATING
Filed July 26, 1933   3 Sheets-Sheet 1
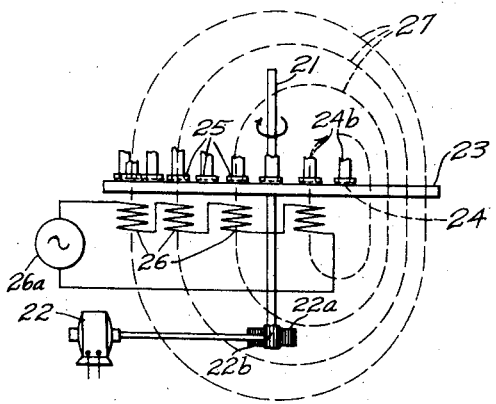
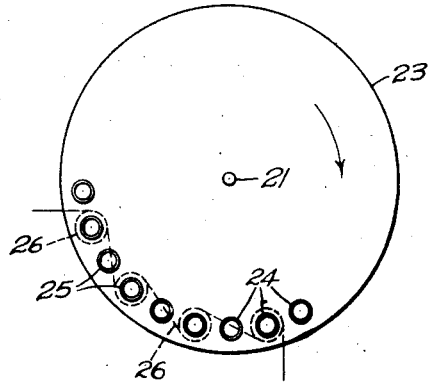
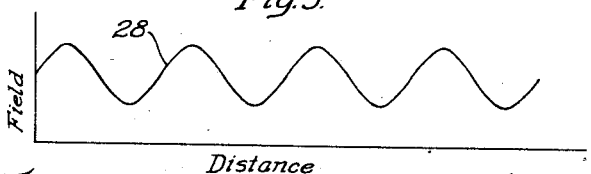
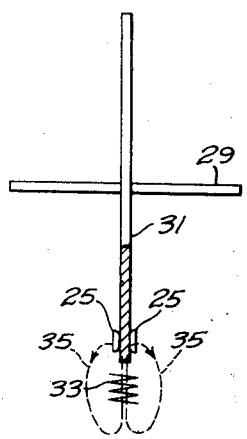
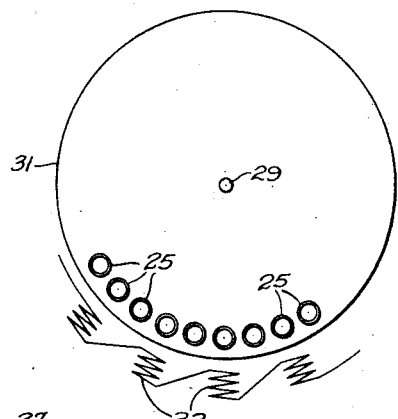
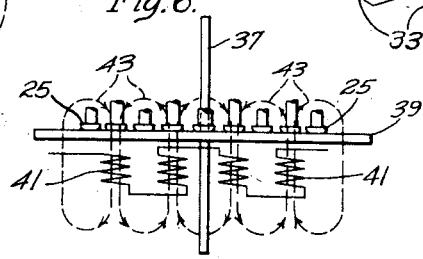
WITNESSES:
INVENTOR
La Verne R. Philpott.
BY
ATTORNEY

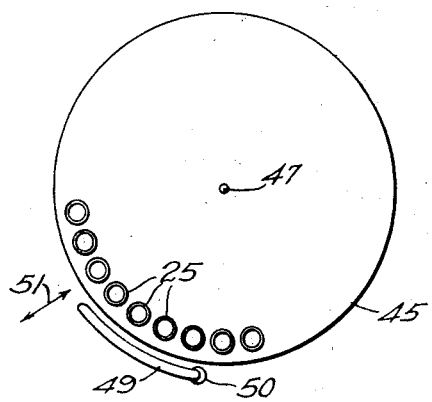
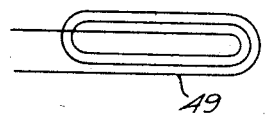
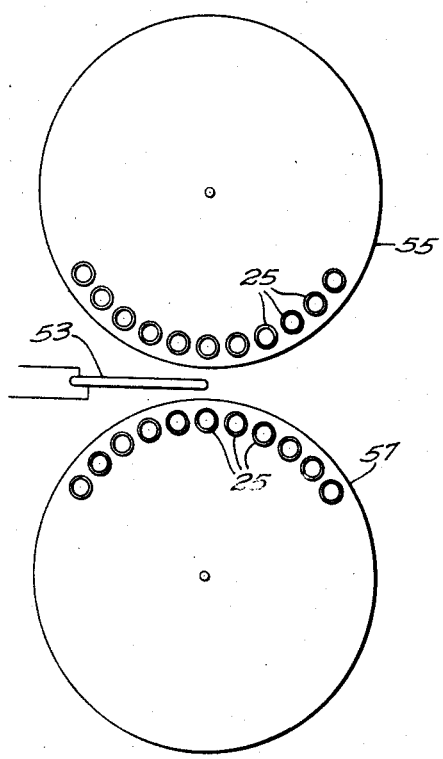
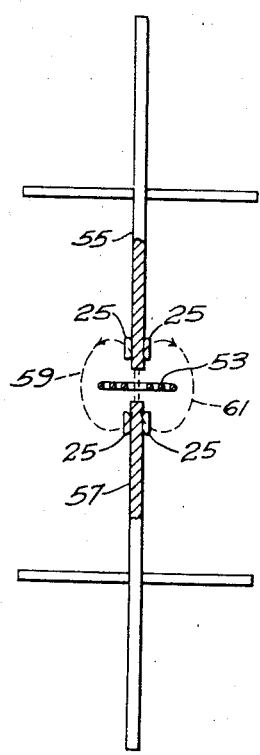

Feb. 12, 1935.  LA VERNE R. PHILPOTT  1,991,062
METHOD OF AND APPARATUS FOR INDUCTIVE HEATING
Filed July 26, 1933  3 Sheets—Sheet 3

WITNESSES:
C. J. Weller.
J. M. Biebel

INVENTOR
LaVerne R. Philpott.
BY W. R. Coley
ATTORNEY

Patented Feb. 12, 1935

1,991,062

UNITED STATES PATENT OFFICE 1,991,062

METHOD OF AND APPARATUS FOR INDUCTIVE HEATING

La Verne R. Philpott, Wilkinsburg, Pa., assignor to Westinghouse Electric & Manufacturing Company, East Pittsburgh, Pa., a corporation of Pennsylvania Application July 26, 1933, Serial No. 682,193

12 Claims. (Cl. 219—13)

My invention relates to electric heating and particularly to a method or process and apparatus for inductively heating metal objects.

An object of my invention is to provide a method and apparatus for inductively heating small and light weight metal disc-like objects.

Another object of my invention is to provide a method and apparatus for inductively heating metal discs in a plurality of successive steps to prevent local overheating thereof.

Another object of my invention is to provide a method and apparatus for inductively uniformly heating a thin metal disc to soften a dry glue-like coating thereon.

Another object of my invention is to provide a method and apparatus for inductively heating a thin metal disc to effect softening of a dry glue-like coating on one side thereof, while another coating on the other side of the disc is not affected.

Still another object of my invention is to provide a method and apparatus for inductively heating metal bottle caps to effect softening of a dry glue-like coating on the inside surface thereof to cause a thin cork wafer to adhere thereto, without softening a coating of enamel on the outside surface of the cap.

Other objects will appear hereinafter.

In practicing my invention I provide one or more coils each having a plurality of turns and traversed by a high frequency alternating current, the metal discs being moved through this field at a predetermined speed.

The use of thin metal discs, usually made of iron, the peripheral edge of which is initially crimped and is then caused to tightly engage an annular enlarged flange at the top of a bottle, is well known. A crown or cap of this kind is usually provided with a relatively thin cork disc or wafer located on the inside of the crown or cap and held in its proper operative position by reason of a thin coating of lacquer or other substance acting as a glue.

In the manufacture of these crown caps the inner surface of the disc is provided with a suitable coating of a glue-like substance, while the outer surface of the crown cap may be provided with a coating of enamel, not only to protect the outer surface of the cap, but also to carry advertising matter as to the contents of the bottle.

The temperature at which the thin coating of glue-like material softens is on the order of 240° F., while the temperature at which the outer coating of enamel softens is on the order of 350° F. These values are given for illustrative purposes only and are not to be considered as limiting in any sense. It is well known that certain material used in the inside of the disc as a glue-like coating will soften at about 240° F. when it is fresh but that its softening temperature increases with age so that when the coating is say from six to eight days old, its softening temperature will be substantially the same as that of the coating of enamel on the outside of the disc. I do not wish to be understood as stating that all glue-like coatings and enamel coatings behave in the manner above indicated, but that particular specimens of bottle caps used commercially, exhibit this behavior and that my improved process for heating the metal caps has been developed in particular connection with such caps but is applicable elsewhere where substantially the same conditions are encountered.

So far as I am aware, the prior practice involving a method of heating bottle caps to ensure softening of the dried glue-like coating has been to pass the caps through a heated zone as through a partially closed chamber in which the air is heated by such means as gas flames. Because of their shape the caps were supported in a substantially horizontal position with the outer surface or face in a downward position so that the heat flow was mainly upwardly, that is through the enamel to the disc and from there to the glue-like coating on the inner face. When the discs were sufficiently heated they were transferred to mechanism which inserted the cork wafer and then pressed it against the caps to cause it to adhere thereto. Some movement of the cap relative to its support would occur in certain cases, resulting in abrading or marring the enameled outer surface, resulting in rejection of such cap.

In contradistinction to this older method of heating and assembly, I propose to heat the bottle caps inductively in an alternating magnetic field, through which the disk-like members or caps are moved in any suitable manner, it being understood that the bottle caps, together with the thin wafer or disc of cork are moved through the field while the cork disc is pressed against the cap, the cooperating relation of the disc and the wafer of cork remaining unchanged as long as the temperature of the disc is sufficiently high and the enamel coating is softened, so that scratching or marring of the enamel surface would result if the disc were moved relative to its support.

I have found that it is undesirable, if not impossible, to effect heating of the disc by electric currents induced therein by inductive action if only one relatively short step of heating be utilized. As is well known, in the case of a disc or of a metal member traversed by an alternating flux at substantially right angles to the plane of the disc or the metal member, the heating currents will traverse mainly the outer peripheral portion of the metal object being heated, because of the so-called "skin-effect". This phenomenon is accentuated when the frequency of the alternations of the electric current traversing the energizing coil is high, as is necessary in the case of these relatively small, thin and, therefore, light-weight bottle caps. I have found, in the inductive heating of the bottle caps, that it is desirable to use a frequency which is on the order of a million cycles per second or more, but I do not wish to be limited to any particular frequency as the selected frequency will depend upon the size, shape and weight of the metal object being inductively heated.

I have found it advisable to effect inductive heating of the body of the disc by a plurality of steps, as by passing each disc through a plurality of spaced alternating electric fields in succession, to permit heat to flow from the peripheral portion of the disc where it is generated to the central portion of the disc, to effect uniform heating of the disc without excessive temperature rise in the periphery of the disc. In other words, the temperature of the periphery of the metal member or of the disc is maintained below that which would be injurious to the metal member or, as in the present case would cause excessive softening of the enamel coating on the outside of the cap. It is to be noted that I prefer to use a sustained alternating electric field, that is one which is energized from a circuit other than one including inductance, capacitance and a gap, which would, of course, produce a damped oscillating current.

In the drawings,

Figure 1 is a schematic view, in front elevation of a mechanism, which may be used to practice my improved method.

Fig. 2 is a top plan view thereof;

Fig. 3 is a schematic view illustrating the field strengths of the energizing coils shown in Figs. 1 and 2;

Fig. 4 is a schematic view in front elevation, of a modified form of a device embodying my invention;

Fig. 5 is a view in side elevation thereof;

Fig. 6 is a schematic view of a modified form of device for practicing my improved method of heating showing also the flux fields obtained by its use.

Fig. 7 is a view in side elevation, showing a further modification of a device with which my method may be practiced;

Fig. 8 is a top plan view of the energizing coil as shown in Fig. 7;

Fig. 9 is a view in side elevation of a still further modification of device for practicing my improved method, Fig. 10 is a view partially in vertical section of the parts shown in Fig. 9;

Figure 11:
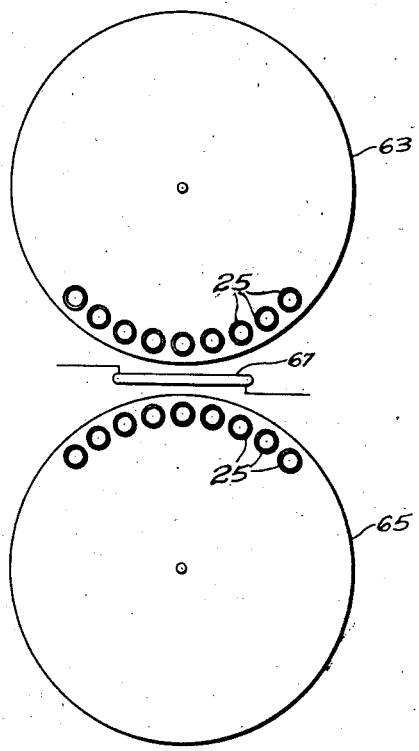
Fig. 11 is a still further modification with which my method can be practiced and being more particularly a modification of the structure shown in Fig. 9.

It is to be understood that the drawings are schematic only and show only such parts as are necessary for a clear understanding of the method embodying my invention, as the mechanical parts constitute no part of my invention proper.

Referring first to Fig. 1 and Fig. 2, I have there illustrated a vertical shaft 21 which is supported in suitable bearings, not shown, and is caused to rotate at a relatively slow speed by means including a motor 22 driving a worm gear 22a secured to shaft 21, by a worm 22b secured to the motor shaft. The motor 22 may be either an alternating current type or a direct current type as may be desired by the operator. Shaft 21 has fixed thereon a disc 23 which is preferably made of electric-insulating material of any suitable kind. A plurality of dished bottle caps 25 of a familiar type are located on the upper surface of horizontal disc 23 and means for pressing a cork wafer 24 against the inner surface of the individual caps may be provided and is shown as including a plunger 24b forced against the wafer by suitable means not shown.

Means for generating a plurality of alternating electric fields is provided in the form of a plurality of coils 26 which may have any suitable number of turns spaced apart and energized by an alternating current of high frequency from a suitable source here shown schematically as an alternating current generator 26a connected to the coils by suitable conductors. Thus, in order to give some idea of the dimensions which I have found effective in a device of this kind, I may say that the disc 23 may have a diameter of anywhere from three to six feet or more, and the individual energizing coils 26 may have, say four to eight turns each, an internal diameter on the order of three to four inches, and have their axes spaced apart a distance on the order of six to eight inches. It is to be noted particularly in this connection that there is no necessity of a definite relation between the spacing of the caps 25 and of the coils 26. The polarity of the coils 26 is the same, that is, the flux lines generated by the coils will be substantially parallel and extend substantially in paths shown by the broken lines 27.

Fig. 3 shows schematically the field strength 28 obtained by an energizing coil structure of the kind shown in Figs. 1 and 2 from which it will appear that the field strength through which the metal discs are moved is variable. While I have shown the paths 27 of the lines of force obtained by the use of the coil structure shown in Figs. 1 and 2 as closed on themselves, it will, of course, be obvious that the general direction of the lines of flux through the disc support and the disc is substantially vertical so that they will traverse the discs at substantially right angles to the plane of the discs. Stated more generally, the metal member being heated inductively is moved crosswise or laterally to the longitudinal axis of symmetry of the magnetic field. In this case, it is obvious that with the frequency of the energizing current traversing the coils being high, the heating currents will flow mainly in the outer peripheral portion of each disc, causing that part to be heated to a temperature which is higher than that of the central portion of the disc. By spacing the individual energizing coils apart it is obvious that there will be a period of reduced current flow in the periphery of the disc after each heating step when the disc is substantially directly over a coil, which reduced-current interval permits of heat equalization throughout the mass of the disc, which will be effected by heat flowing from the periphery of the disc to the central portion of the disc which is, initially at least, at a much lower temperature. I am thus enabled to effect uniform temperature rise of the entire mass of the disc within a relatively short period of time, which may be of the order of one to two seconds, by effecting the heating thereof inductively in a plurality of steps with intermediate heat-equalizing periods in which the heat flows from a portion of the disc having a higher temperature to a portion of the disc having a lower temperature. As noted hereinbefore, it is essential that there be no movement of a cap 25 relatively to the disc 23 during such time as partial softening of the outer enamel coating has been effected and it is, therefore, to be understood that the plurality of coils 26 occupy a relatively small portion of the periphery of the disc 23 and that the caps 25 are pressed in their proper operative position on the disc 23 well ahead of the first energizing coil and are removed from the disc 23 only after the disc and the enamel coating thereon has reached a sufficiently low temperature so that the enamel coating is again hard. It is obvious that the requirement of not exceeding a certain temperature rise in any one part of a metal member being thus inductively heated, may be encountered in other applications. Thus, it may be desired to heat treat small metal discs such as circular saws, spring washers, etc. and it is obvious that my method can be utilized for such heat treatment.

It will be noted that the structure shown in Figs. 1 and 2 of the drawings and with which I have successfully practiced the method embodying my invention permits of using only one face of the disc 23. In order to make better use of the rotating disc, as by using both surfaces, thereof, the structure shown in part in Figs. 4 and 5 of the drawings may be used which includes a horizontal shaft 29, a vertical disc 31 mounted thereon, suitable bearings being provided for the shaft 29, as well as driving means of the same kind as is shown in Fig. 1 for the shaft to cause it to rotate at the desired speed. In this case, a plurality of caps 25 may be located on one face of the movable disc 31, while a similar set of caps 25 may be located against the other face of movable disc 31, it being understood that suitable means of any kind are provided to press the cork wafer into the dished cap 25. I provide a plurality of energizing coils 33 which are traversed by a high-frequency alternating current, and it is to be noted that the connections between the individual coils 33 are such that the direction of the lines of force from the individual coils are substantially parallel, that is, the polarity of the coils adjacent to disc 31 is the same at any one instant of time. I have indicated, by arrows 35 in Fig. 4 of the drawings, the general direction of the lines of force, and it will be noted that insofar as the discs 25 are concerned, the lines of force traverse the discs at substantially right angles to the major plane thereof. This will cause inductive heating of the periphery of the caps 25 and I, therefore, utilize a plurality of spaced coils in substantially the same manner as was hereinbefore described in connection with the mechanical structure shown in Figs. 1 and 2 and obtain substantially the same result.

It is, of course obvious that the length of time which must elapse between the successive steps of inductive heating of the crowns or caps must be sufficiently long to permit the proper degree of heat equalization between the rim and the center of each cap, and in order to assist in this heat equalization I may practice my improved method by a structure shown more particularly in Fig. 6 of the drawings. A rotatable vertical shaft 37 supports a horizontally-extending disc 39 rotating therewith, this part of the structure being substantially the same as shown in Fig. 1 of the drawings, it being understood that a driving means similar to that of Fig. 1 is provided. A plurality of high-frequency alternating-current-traversed energizing coils 41 are provided, but in contradistinction to the connection shown in Fig. 1 for coils 26, the individual coils 41 are so connected that the flux fields of adjacent coils are in opposition. I have endeavored to illustrate by the broken lines 43, the path of the flux lines, and it will be noted that these paths are somewhat shorter than those shown by the broken lines 27 in Fig. 1 of the drawings, and that it is possible to so correlate the path of the moving caps 25 and the energizing coils 41 that the caps 25 will be caused to move through a flux field which, for a part of the time, traverse the discs substantially parallel to or in the plane of the disc. This, of course, means that an electric current will be generated in the central portion of the disc which will materially aid the inductive heating thereof so that it is possible to locate the coils somewhat closer together as regards the distance between their axes, whereby the highly desirable result of a decreased heating time is obtained.

Referring now to Figs. 7 and 8 of the drawings, I have there illustrated a modified form of device with which my method may be practiced, which device includes a single supporting disc 45 of substantially the same character as disc 31 and supported by a rotating horizontal shaft 47, the crowns or caps 25 being located thereagainst adjacent the periphery at both sides thereof. I provide a high-frequency alternating-current traversed coil 49 which, while plane in one direction, is arcuate in the other direction, so as to follow relatively closely the periphery of disc 45 substantially as shown in Fig. 7. I prefer to locate one end of energizing coil 49 in a pivotal mounting indicated at 50, while the other end of coil 49 may be moved toward or away from the periphery of disc 45, which movement is indicated by the arrow 51 in Fig. 7 of the drawings.

The structure shown in Fig. 7 will provide a sustained electric flux field of substantially constant strength as long as the coil 49 is substantially concentric with the periphery of disc 45 and the path of the caps 25. A gradually decreasing field strength can, however, be obtained by moving the one end of coil 49 away from the disc 45.

Referring now to Fig. 9 of the drawings, I have there illustrated the use of a flat plane high-frequency alternating-current traversed coil 53 located between two rotatable supporting discs 55 and 57, Fig. 10 showing a vertical view of the structure from which it will be noted that the respective flux lines will traverse two sets of caps, one set of caps being located on disc 55 while the other set is located on disc 57, the probable paths of the flux lines being indicated by the broken lines 59 and 61.

Referring now to Fig. 11 of the drawings, I have there illustrated two discs 63 and 65, each supported on a rotatable horizontally-extending shaft, while a single flat plane high-frequency alternating-current traversed coil 67 is located therebetween. It may be noted that, while one end of coil 53 in Fig. 9 of the drawings is shown as being located quite closely to the peripheries of discs 55 and 57, the other end of coil 53 is located at some distance away from the periphery of the discs, thus providing a graded field of flux for the respective caps to be heated. The structure shown in Fig. 11 differs from that shown in Fig. 10 only in that coil 67 has been moved so that the caps will first move into a flux field of initially increasing strength and then of gradually decreasing strength.

Figure 12:
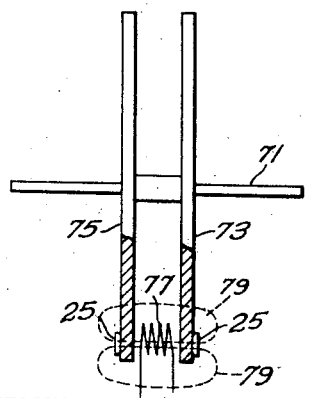
Fig. 12 is a view, in front elevation, of another modification with which my method may be practiced.
Figure 13:
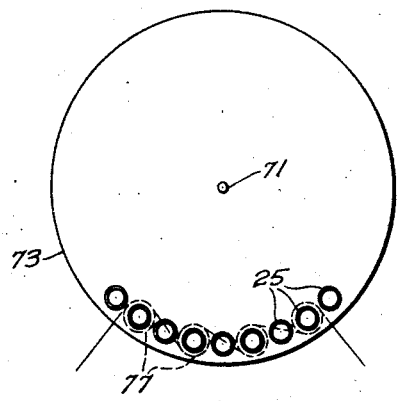
Fig. 13 is a view in side elevation thereof.

Referring now to Figs. 12 and 13, I have there illustrated another modification of device with which my method may be practiced. A shaft 71 supported in a horizontal position by bearings (not shown) has mounted thereon two supporting discs or tables 73 and 75 spaced apart by a distance large enough to receive a plurality of spaced high-frequency alternating-current energized coils 77 therebetween, the axes of the coils extending parallel to the axis of the shaft 71. By way of illustration, it may be mentioned that the distance between the inner faces of the discs 73 and 75 may be as small as two and one-half inches.

The caps to be heated are located against the outer faces of the respective discs 73 and 75, the cork wafers being pressed into the discs by means not shown in the drawings. The broken lines 79 show generally only the paths of some of the flux lines from which it will be noted that the path of travel of the metal members to be inductively heated is laterally of the longitudinal axis of symmetry of the field.

It may be noted that instead of first heating a coating of enamel on one side of a thin metal cap, transmitting the heat from this coating to the metal body itself and from there to the inner coating of a dry glue-like substance, I heat the metal body itself and effect this heating in a plurality of steps so as not to cause over-heating of the metal object or of the enamel coating on one side of the cap or crown, sufficient time elapsing between successive heating steps to permit a more or less complete heat equalization between the periphery and the center of the cap. It is evident that the temperature difference between the periphery and the center of the cap is greatest after the first step of heating has been effected, that is, immediately after the cap or crown has passed through the flux field of the first coil to which it is subjected. The amount of energy transferred inductively to the cap can, therefore, be a maximum at the first instant of heating effect and it is thus possible to use a structure of the kind shown particularly in Figs. 9 and 10 of the drawings and still obtain good results. As the temperature of the central portion of the metal objects or caps rises the transfer or flow of heat from the periphery to the center of the disc will be decreased somewhat and this condition may or may not be made use of in the method practiced by use of the structures shown in the drawings.

I claim as my invention:

1. The method of softening a dry coating of adhesive on a metal disc, which includes the step of generating heat in the periphery of the disc only and intermittently effecting said generation of heat in the periphery of the disc until the temperature thereof is substantially uniform over its entire area and high enough to soften the coating.

2. The method of softening a dry coating of adhesive on a metal disc, which includes the step of generating heat in the periphery of the disc only by electric inductive action, permitting the heat to permeate the entire mass of the disc and intermittently effecting said generation of heat in the periphery of the disc a number of times until the temperature thereof is substantially uniform over its entire area and high enough to soften the coating.

3. The method of softening a dry coating of adhesive on a metal disc, which includes the step of generating heat in a particular part of the disc by subjecting it to the action of a sustained alternating magnetic field and effecting said generation of heat in a particular part of the disc a plurality of spaced times until the temperature of the entire disc is substantially uniform and high enough to soften the coating.

4. The method of softening a dry coating of adhesive on a thin metal disc, which includes the step of moving the disc substantially crosswise to the longitudinal axis of symmetry of a plurality of spaced sustained alternating magnetic fields to effect heating mainly of the periphery, the time of passage of the disc through the said fields being such as to effect heat flow from the periphery to the central portion of the disc to obtain substantially uniform temperature conditions in the disc at a value high enough to soften the coating.

5. The method of softening a dry glue-like coating on a metal disc, which includes the step of subjecting the disc to repeated alternate localized heating and heat-equalization until the temperature of the entire disc is substantially uniform and high enough to soften the coating.

6. The method of softening a dry glue-like coating on a metal disc, which includes the step of raising the temperature of the coating by conducting substantially the same amount of heat per unit area of the coating to it from the disc itself in a plurality of distinct sequential steps.

7. The method of softening a dry glue-like coating on a metal disc, which includes the step of gradually raising the temperature of the coating by successive steps of non-uniform heating of the disc and substantial heat equalization therein to conduct heat to the coating and to soften the same uniformly over its entire area.

8. The method of softening a dry glue-like coating on a thin metal disc, which includes the step of heating the disc by subjection to a plurality of spaced sustained alternating magnetic fields of high frequency in succession, the spacing between the successive fields being such as to effect heat equalization in the disc after each non-uniform heating thereof by a magnetic field.

9. The method of softening one of two coatings which soften at different temperatures and are located on different sides of a thin metal disc, which includes the step of raising the temperature of the disc by a series of electric inductive actions thereon at a rate sufficient to soften the low-temperature coating in a predetermined time while retaining the higher-temperature coating substantially unchanged.

10. The combination with a bottle cap of disc shape, of a supporting structure therefor, a plurality of spaced flux-producing devices located in inductive relation to the supporting structure and means for moving the supporting structure to place said cap in inductive relation to the successive flux producing devices.

11. The combination with a bottle cap of disc shape, of a supporting structure therefor, a plurality of spaced alternating-current-traversed coils located in inductive relation to the supporting structure and motive means for moving the supporting structure to place said cap in inductive relation to the successive coils.

12. The combination with a bottle cap of disc shape, of a supporting structure therefor, a plurality of spaced high frequency alternating-current-traversed coils located adjacent to that part of the supporting structure engaging the bottle cap and motor means for effecting movement of the supporting structure to place said cap in inductive relation to the coils in sequence.

LA VERNE R. PHILPOTT.

DISCLAIMER 1,991,062.—*La Verne R. Philpott*, Wilkinsburg, Pa. METHOD OF AND APPARATUS FOR INDUCTIVE HEATING. Patent dated February 12, 1935. Disclaimer filed September 29, 1936, by the assignee, *Westinghouse Electric & Manufacturing Company*.

Hereby enters this disclaimer to claims 1, 2, 3, 5, 6, 7, and 9 of the specification.
[*Official Gazette October 20, 1936.*]